(12) United States Patent
McDonald et al.

(10) Patent No.: US 8,390,276 B2
(45) Date of Patent: Mar. 5, 2013

(54) TARGET MAGNET ASSEMBLY FOR A SENSOR USED WITH A STEERING GEAR

(75) Inventors: Kenneth McDonald, Novi, MI (US); James Thomas, Clarkston, MI (US); Kevin Laycock, Lambertville, MI (US)

(73) Assignee: Bourns Incorporated, Riverside, CA (US)

( * ) Notice: Subject to any disclaimer, the term of this patent is extended or adjusted under 35 U.S.C. 154(b) by 227 days.

(21) Appl. No.: 12/891,287

(22) Filed: Sep. 27, 2010

(65) Prior Publication Data
US 2012/0074808 A1 Mar. 29, 2012

(51) Int. Cl.
*G01B 7/30* (2006.01)
(52) U.S. Cl. .................... 324/207.25; 324/174
(58) Field of Classification Search .................. 324/174, 324/207.25
See application file for complete search history.

(56) References Cited

U.S. PATENT DOCUMENTS

| | | | |
|---|---|---|---|
| 4,724,710 A | 2/1988 | Murty | |
| 4,785,674 A | 11/1988 | Orman et al. | |
| 4,791,366 A | 12/1988 | Suzuki et al. | |
| 5,880,586 A | 3/1999 | Dukart et al. | |
| 6,018,318 A | 1/2000 | Schodlbauer | |
| 6,104,185 A | 8/2000 | Lamm et al. | |
| 6,124,709 A | 9/2000 | Allwine | |
| 6,244,296 B1 | 6/2001 | Lafler et al. | |
| 6,250,420 B1 | 6/2001 | Brenner et al. | |
| 6,324,905 B2 | 12/2001 | Noltemeyer et al. | |
| 6,433,535 B1 | 8/2002 | Marx et al. | |
| 6,466,889 B1 | 10/2002 | Schodlbauer | |
| 6,507,188 B1 | 1/2003 | Dilger et al. | |
| 6,538,426 B1 | 3/2003 | Enrietto et al. | |
| 6,552,453 B2 | 4/2003 | Ohiwa et al. | |
| 6,616,688 B2 | 9/2003 | Von Oepen | |
| 6,644,134 B2 | 11/2003 | Laidlaw et al. | |
| 6,657,350 B2 | 12/2003 | Kimura et al. | |
| 6,720,762 B2 | 4/2004 | Okumura | |
| 6,763,733 B2 | 7/2004 | Tokumoto | |
| 6,912,923 B2 | 7/2005 | Froehlich et al. | |
| 7,021,160 B2 | 4/2006 | Pattok et al. | |
| 7,028,545 B2 | 4/2006 | Gandel et al. | |
| 7,188,533 B2 | 3/2007 | Pattok et al. | |

(Continued)

FOREIGN PATENT DOCUMENTS

| | | |
|---|---|---|
| JP | 4163766 | 6/1992 |
| JP | 7037323 | 2/1995 |
| JP | 2006071326 | 3/2006 |
| WO | 2007/014599 | 2/2007 |

OTHER PUBLICATIONS

F. Jerems, et al., "Sensor for Modern Steering Assist Systems", SAE Technical Paper Series, SAE International, 2004 SAE World Congress, Detroit, Michigan, Mar. 8-11, 2004.

(Continued)

*Primary Examiner* — Bot Ledynh
(74) *Attorney, Agent, or Firm* — Michael Best & Friedrich LLP (57) ABSTRACT

A target magnet assembly configured to be secured to a rotating shaft of a steering gear assembly. The target magnet assembly includes an index hub with a mount and a magnet secured by the mount. The mount includes a tab with a protrusion extending from the tab, a finger, and a stop. The magnet includes an axial retention groove receiving the finger, a top surface abutting the stop, and a radial retention groove receiving the protrusion.

20 Claims, 13 Drawing Sheets

U.S. PATENT DOCUMENTS

| | | |
|---|---|---|
| 7,231,837 B2 | 6/2007 | McCoy, Jr. |
| 7,293,472 B2 | 11/2007 | Tokumoto et al. |
| 7,307,415 B2 | 12/2007 | Seger et al. |
| 7,363,825 B2 | 4/2008 | Feng et al. |
| 7,406,884 B2 | 8/2008 | Jerems et al. |
| 7,415,898 B2 | 8/2008 | Ishihara et al. |
| 7,415,899 B2 | 8/2008 | Tokumoto et al. |
| 7,477,052 B2 | 1/2009 | Schmidt |
| 7,564,590 B2 | 7/2009 | Sugimoto |
| 7,592,798 B2 * | 9/2009 | Yabe et al. .................... 324/174 |
| 7,631,574 B2 | 12/2009 | Leone |
| 7,644,635 B2 | 1/2010 | Prudham et al. |
| 7,798,019 B2 | 9/2010 | Osuka et al. |
| 8,015,885 B2 | 9/2011 | Arita et al. |
| 2007/0180905 A1 | 8/2007 | Kaoku et al. |
| 2007/0186694 A1 | 8/2007 | Tokumoto et al. |
| 2009/0321173 A1 | 12/2009 | Shevchenko |

OTHER PUBLICATIONS

Office Action from the State Intellectual Property Office of the People's Republic of China for Application No. 201010501278.9 dated Oct. 23, 2012 (English Translation and Original, 10 pages).

Office Action from the Japanese Patent Office for Application No. 2010-226524 dated Oct. 5, 2012 (English Translation Only, 5 pages).

Office Action from the United States Patent Office for U.S. Appl. No. 12/891,236 dated Sep. 27, 2012 (6 pages).

* cited by examiner

TARGET MAGNET ASSEMBLY FOR A SENSOR USED WITH A STEERING GEAR

RELATED APPLICATIONS

The present application is related to U.S. application Ser. No. 12/891,236 entitled "Three-piece Torque Sensor Assembly".

BACKGROUND

The present invention relates to a target magnet assembly used with a steering gear. The target magnet assembly is used to provide a target magnet for a sensor capable of detecting a magnetic field.

SUMMARY

Traditional torque sensor assemblies are designed as an integrated sensor assembly that is assembled and secured to the input shaft and output shaft assembly of a steering gear of an automobile or similar vehicle steering system. As a result, the entire steering gear must be removed from a vehicle and disassembled if service is required to repair the torque sensor assembly or its components, such as a sensor. The torque sensor described below provides a three-piece torque sensor assembly including a stator subassembly, a magnet subassembly, and a sensor module. The sensor module can be assembled and serviced independently of the stator subassembly and the magnet subassembly, without the need to remove the entire steering gear. The sensor module includes a sensor module locator that functions to decrease tolerance stack up between the stator subassembly, the magnet subassembly, and the sensor module by positioning the sensor module with respect to the stator subassembly.

The invention provides a target magnet assembly configured to be secured to a rotating shaft of a steering gear assembly. The target magnet assembly includes an index hub with a mount and a magnet secured by the mount. The mount includes a tab with a protrusion extending from the tab, a finger, and a stop. The magnet includes an axial retention groove receiving the finger, a top surface abutting the stop, and a radial retention groove receiving the protrusion.

The invention also provides a stator assembly configured to be used as a component of a torque sensor for a steering gear assembly. The stator assembly includes a stator subassembly and an target magnet assembly secured to the stator subassembly. The target magnet assembly includes an index hub with a mount and a magnet secured by the mount. The mount includes a tab with a protrusion extending from the tab, a finger, and a stop. The magnet includes an axial retention groove receiving the finger, a top surface abutting the stop, and a radial retention groove receiving the protrusion.

The invention also provides a method for securing a target magnet to a hub. The method includes the step of providing a hub with a mount. The mount includes a tab with a protrusion extending from the tab, a finger, and a stop. The method also includes the step of providing a target magnet. The magnet includes an axial retention groove for receiving the finger, a top surface for abutting the stop, and a radial retention groove for receiving the protrusion. The method further includes the step of inserting the target magnet into the mount, thereby causing the axial retention groove to receive the finger, the top surface to abut the stop, and the radial retention groove to receive the protrusion.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
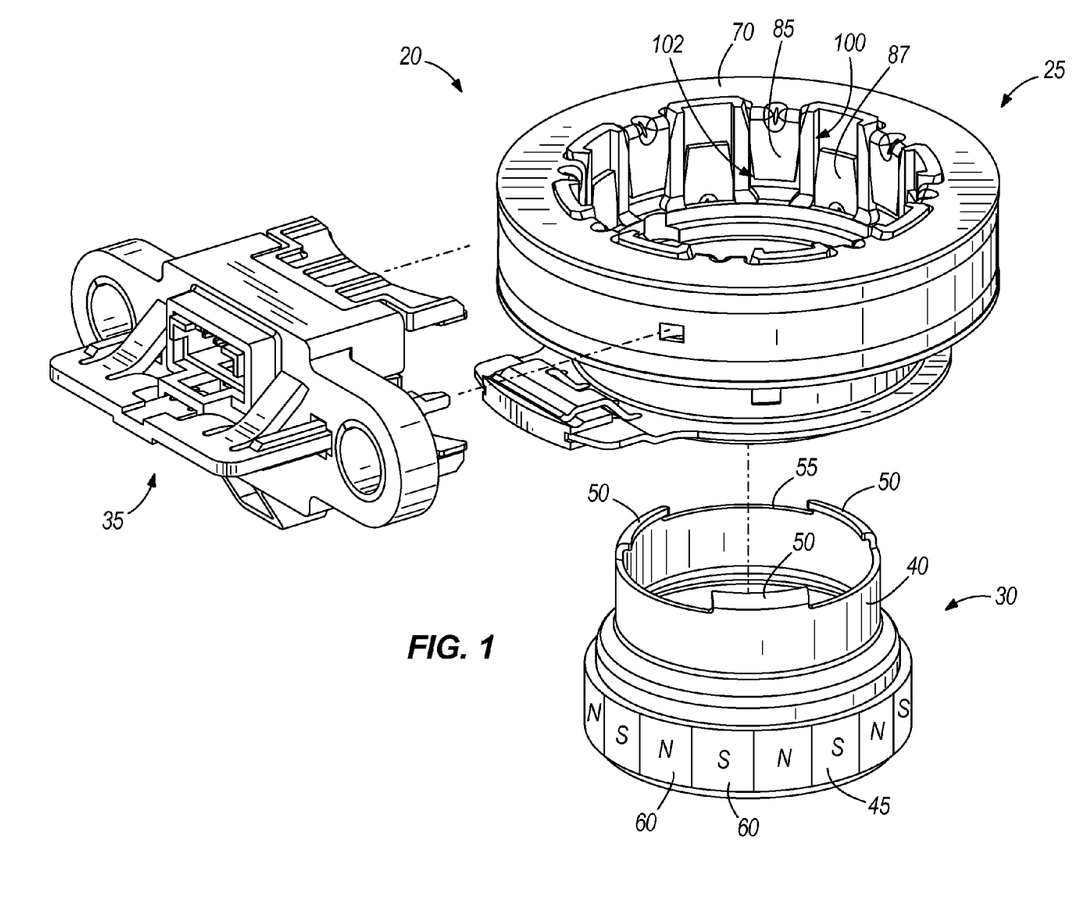
FIG. 1 is an exploded view of a three-piece torque sensor assembly.
Figure 2:
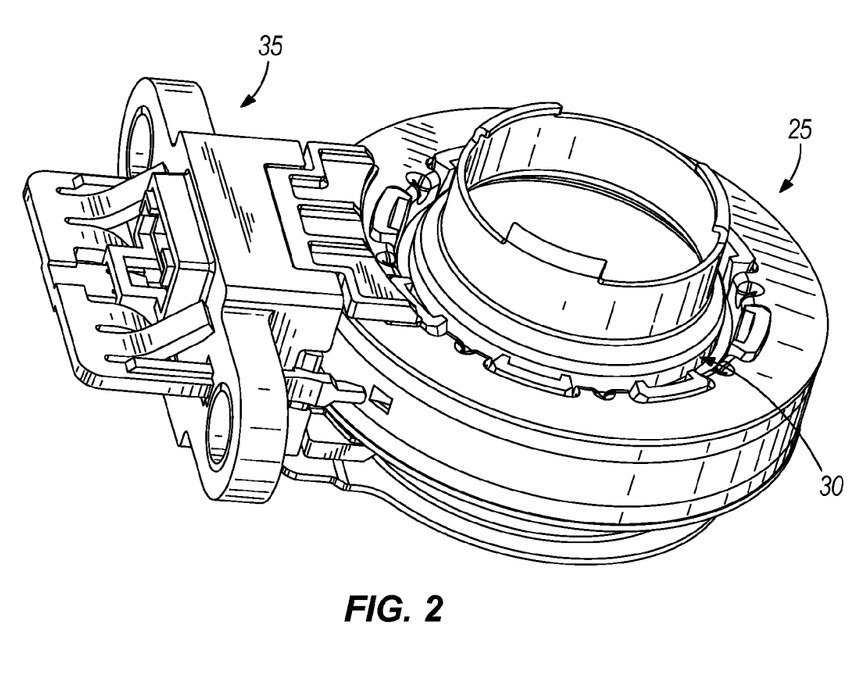
FIG. 2 is a perspective view of the three-piece torque sensor assembly of FIG. 1.

As shown in FIGS. 1 and 2, a torque sensor assembly 20 includes a stator subassembly 25, a magnet assembly 30, and a sensor module 35. The torque sensor assembly 20 can be used with a variety of mechanical assemblies, but will be described as used with a steering gear assembly of an automobile.

As shown in FIG. 1, the magnet assembly 30 includes a ring-shaped hub 40 and a multi-pole magnet 45 secured to the hub 40. The hub 40 includes three tabs 50 that extend from a top surface 55 of the hub 40. The magnet 45 includes multiple equally-sized poles 60. The poles 60 alternate between north polarity and south polarity.

Figure 3:
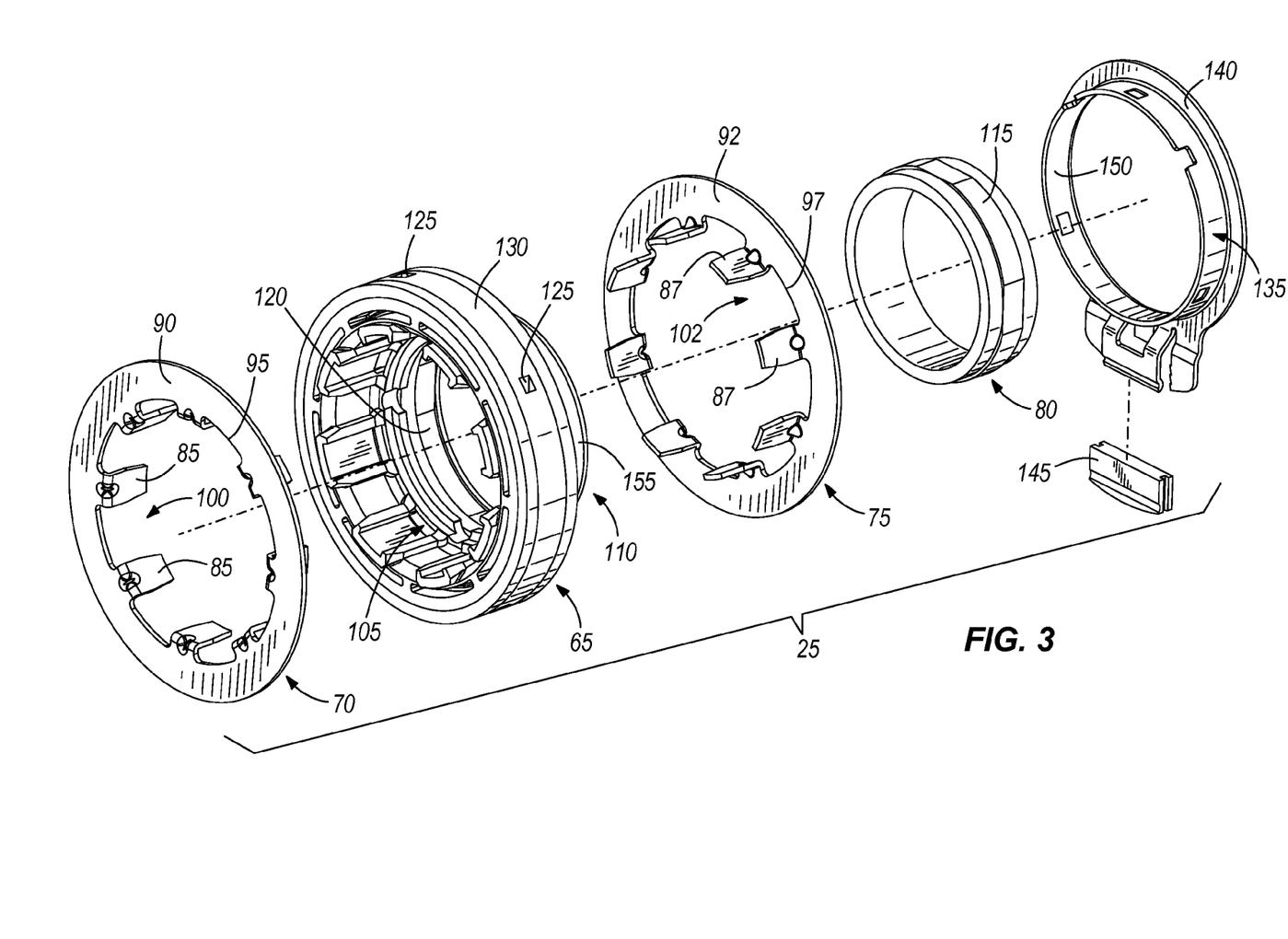
FIG. 3 is an exploded view of a stator subassembly of the three-piece torque sensor assembly of FIG. 1.

As shown in FIG. 3, the stator subassembly 25 includes a ring-shaped stator molding 65, a first stator 70, a second stator 75, and a stator yoke 80. Each stator 70 and 75 includes magnetic fingers 85, 87 that extend substantially perpendicularly from a ring-shaped base 90, 92. The fingers 85, 87 are equally spaced around an inside perimeter 95, 97 of the base 90, 92 creating a gap 100, 102 between every two adjacent fingers 85, 87. The spacing of the fingers 85 and 87 aligns with the spacing of the poles 60 of the multi-pole magnet 45. Both stators 70 and 75 are secured to the stator molding 65 with the magnetic fingers 87 of the second stator 75 received by associated holes 105 through the stator molding 65. As shown in FIG. 1, when both stators 70 and 75 are secured to the stator molding 65, the fingers 85 of the first stator 70 are positioned in the gaps 102 of the second stator 75 and the fingers 87 of the second stator 75 are positioned in the gaps 100 of the first stator 70. The stator yoke 80 is ring-shaped and is secured to the stator molding 65 at a first end 110 of the stator molding 65 such that an outer surface 115 of the stator yoke 80 engages an inner surface 120 of the stator molding 65. The stator molding 65 includes two engagement apertures 125 that extend from an outer surface 130 of the stator molding 65 into the stator molding 65.

Additionally, the stator subassembly 25 includes a target magnet assembly 135 secured to the stator molding 65. The target magnet assembly 135 includes a ring-shaped index hub 140 and a target magnet 145 secured to the index hub 140. The index hub 140 is secured to the stator molding 65 such that an inner surface 150 of the index hub 140 engages a second outer surface 155 of the stator molding 65.

Figure 4:
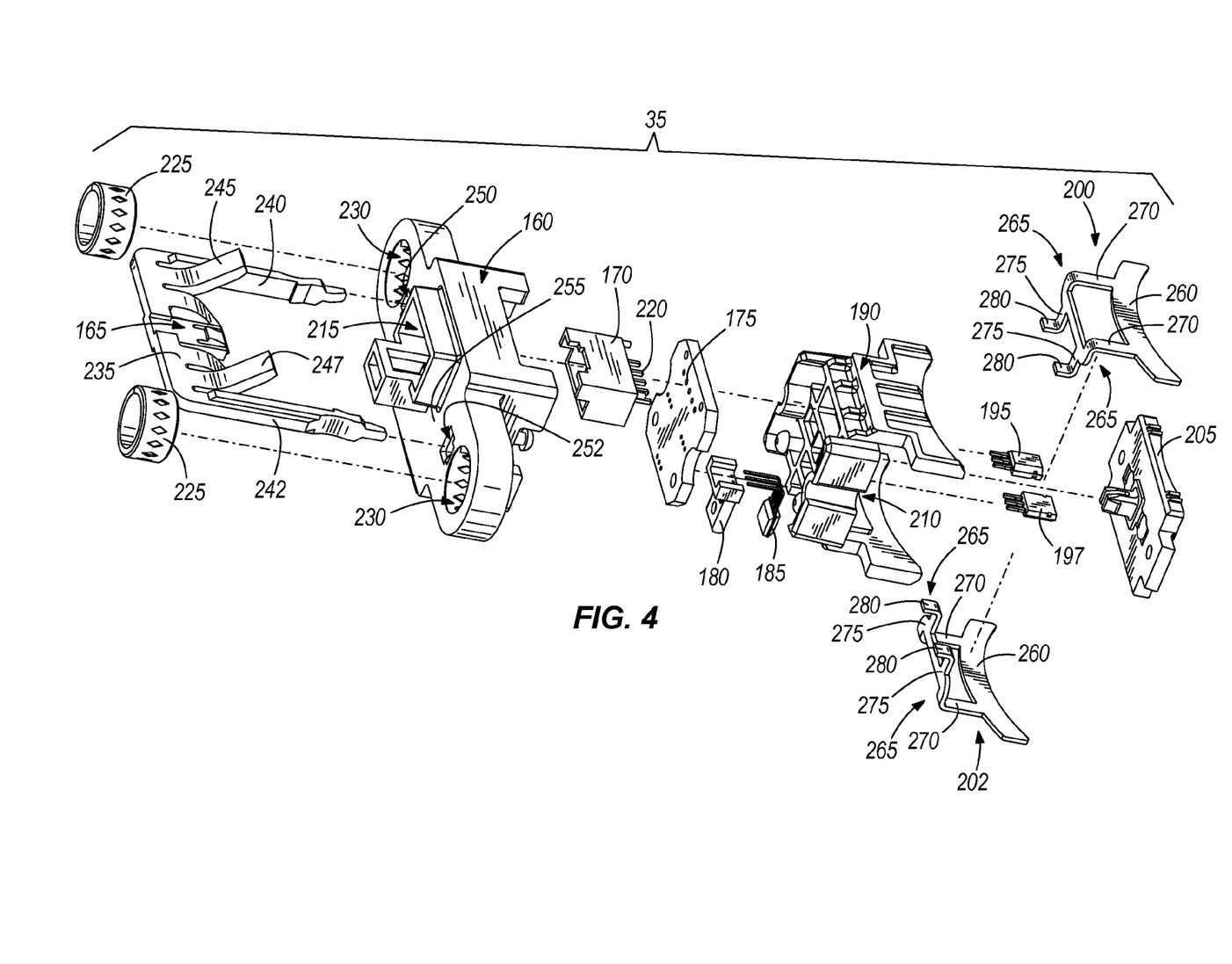
FIG. 4 is an exploded view of a sensor module of the three-piece torque sensor assembly of FIG. 1.

As shown in FIG. 4, the sensor module 35 includes a sensor housing 160, a sensor module locator 165, a connector 170, a printed circuit board (PCB) 175, a position sensor housing 180, an position sensor 185, a carrier 190, two torque sensors 195 and 197, two magnetic collectors 200 and 202, and a cover 205. The PCB 175 is secured between the sensor housing 160 and the carrier 190. The position sensor 185 is secured to the position sensor housing 180 and is electrically connected to PCB 175. The position sensor housing 180 is secured to the carrier 190 and is positioned to sense the target magnet 145. The torque sensors 195 and 197 are secured to the carrier 190 and electrically connected to the PCB 175. The cover 205 is secured to a rear surface 210 of the carrier 190 to protect the electrical components of the sensor module 35 from exposure to the elements. The connector 170 is inserted through a connector opening 215 through the sensor housing 160. The connector 170 includes pins 220 that engage the PCB 175, thereby electrically connecting the connector 170 to the PCB 175. The connector 175 is also electrically connected to a control module (not shown), for example a power steering control module, located elsewhere in the automobile. A pair of bushings 225 is secured inside a pair of holes 230 through the sensor housing 160.

Each of the torque sensors 195 and 197 is a linear Hall effect sensor that detects the magnetic field intensity induced into the collectors 200 and 202 by the stator subassembly 25 and the magnet subassembly 30. Other sensors capable of detecting changes in a magnetic field could also be used. The two torque sensors 195 and 197 provide a two-channel redundant torque sensing function. Alternatively, the sensor module 35 could be constructed with a single torque sensor should redundancy not be required.

The position sensor 185 is a linear Hall effect sensor capable of detecting changes in a magnetic field generated by the target magnet 145. Other sensors capable of detecting changes in a magnetic field could also be used.

The sensor module locator 165 includes a body 235 with two protrusions 240 and 242 extending from the body 235 and a pair of biasing members 245 and 247. The sensor module locator 165 is slidably received by the sensor housing 160 with each of the protrusions 240 and 242 received by an associated protrusion opening 250 and 252 through the sensor housing 160. The biasing members 245 and 247 engage a front surface 255 of the sensor housing 160.

The first collector 200 and the second collector 202 are identical. Therefore, only the first collector 200 will be described in detail. The first collector 200 includes a curved portion 260 with two legs 265 extending from the curved portion 260. The legs 265 are S-shaped such that a first section 270 of each leg 265 is perpendicular to a second section 275 of each leg 265 and the first section 270 is parallel to a tab 280 that forms a third section of each leg 265. The collectors are secured to the sensor housing, such that each tab 280 of the first collector 200 is positioned above a corresponding torque sensor 195 and 197 and each tab 280 of the second collector 202 is positioned below a corresponding torque sensor 195 and 197.

Figure 5:
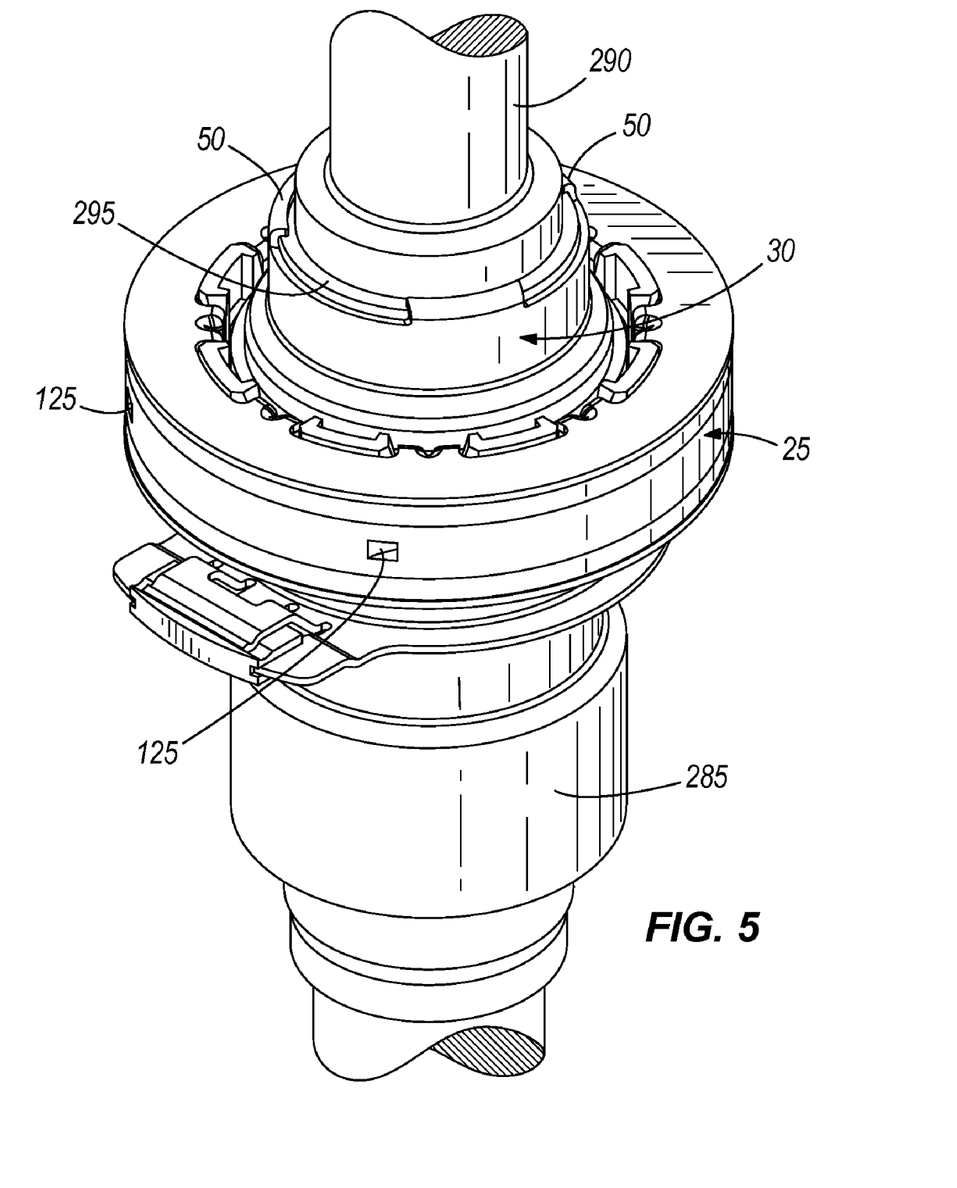
FIG. 5 is a perspective view of a portion of the three-piece torque sensor assembly of FIG. 1.

As shown in FIG. 5, the stator subassembly 25 is secured to an input shaft 285 and the magnet subassembly 30 is secured to an output shaft 290. The input shaft 285 and the output shaft 290 are connected by a torsion bar (not shown). The torsion bar allows the input shaft 285 to rotate relative to the output shaft 290. The magnet subassembly 30 is secured to the output shaft 290 by the crimping the tabs 50 such that the tabs 50 engage a collar 295 of the output shaft 290. Alternatively, the magnet subassembly 30 is welded to the output shaft 290. Alternatively, no hub 40 is used and the magnet 45 is secured directly to the output shaft 290. The stator subassembly 25 is secured to the input shaft 285 by a compression fit between the stator yoke 80 and the input shaft 285. Alternatively, the stator subassembly 25 does not include the stator yoke 80 and the stator assembly 25 is secured to the input shaft 285 by welding, adhesive bonding, or other methods known in the art. The magnet subassembly 30 could be secured to the input shaft 285 and the stator subassembly 25 secured to the output shaft 290 by any of the methods described above.

Figure 6:
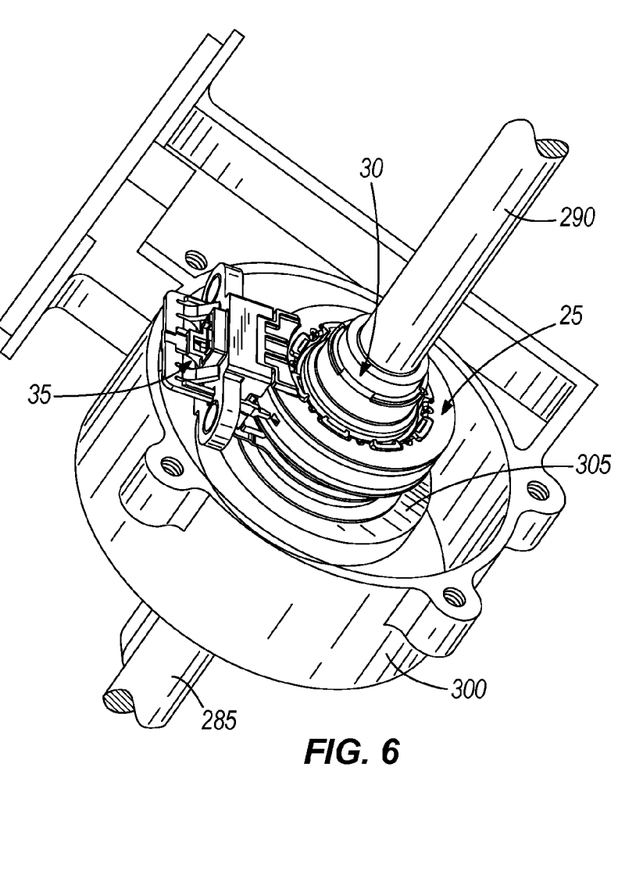
FIG. 6 is a perspective view of the three-piece torque sensor assembly of FIG. 1 positioned in a steering gear housing with the top portion of the steering gear housing not shown.
Figure 7:
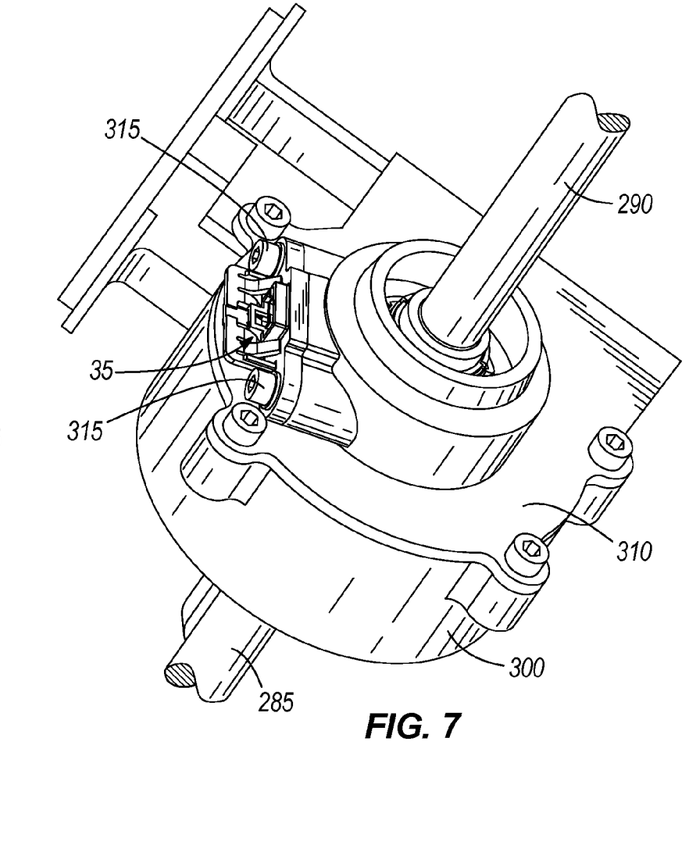
FIG. 7 is a perspective view of the three-piece torque sensor assembly of FIG. 1 positioned in a steering gear housing.

As shown in FIG. 6, the stator subassembly 25 secured to the input shaft 285 and the magnet subassembly 30 secured to the output shaft 290 are positioned within a steering gear housing 300 including a bearing 305. The input shaft 285 and the output shaft 290 extend through the steering gear housing 300. As shown in FIG. 7, the sensor module 35 is secured to a top portion 310 of the steering gear housing 300 by a pair of bolts 315.

The torque sensor assembly 20 is used to sense the torque applied to the input shaft 285 by measuring the differential position change between the input shaft 285 and the output shaft 290. The torque sensors 195 and 197 detect the magnetic field intensity within the magnetic circuit defined by the torque sensors 195 and 197, the magnet subassembly 30, the stator subassembly 25, and the collectors 200 and 202. This magnetic field is proportional to the differential displacement between the input shaft 285 and the output shaft 290. The collectors 200 and 202 optimize the performance of the two torque sensors 195 and 197 by directing the magnetic field induced by the stator subassembly 25 and magnet subassembly 30 from the curved portions 260 to the tabs 280 located adjacent to the torque sensors 195 and 197. The width of the poles 60 of the multi-pole magnet 45 determines the differential position measurement range of the torque sensor assembly 20 with respect to the relative rotational displacement between the input shaft 285 and the output shaft 290.

The position sensor 185 senses the presence of the magnetic field generated by the target magnet 145 attached to the stator subassembly 225 when the stator subassembly 225 is in a home position. In the home position, the position sensor 185 is positioned adjacent to target magnet 145. When a steering wheel connected to the input shaft 285 is turned, the input shaft 285 rotates, thereby rotating the target magnet 145 out of the home position.

Figure 8:
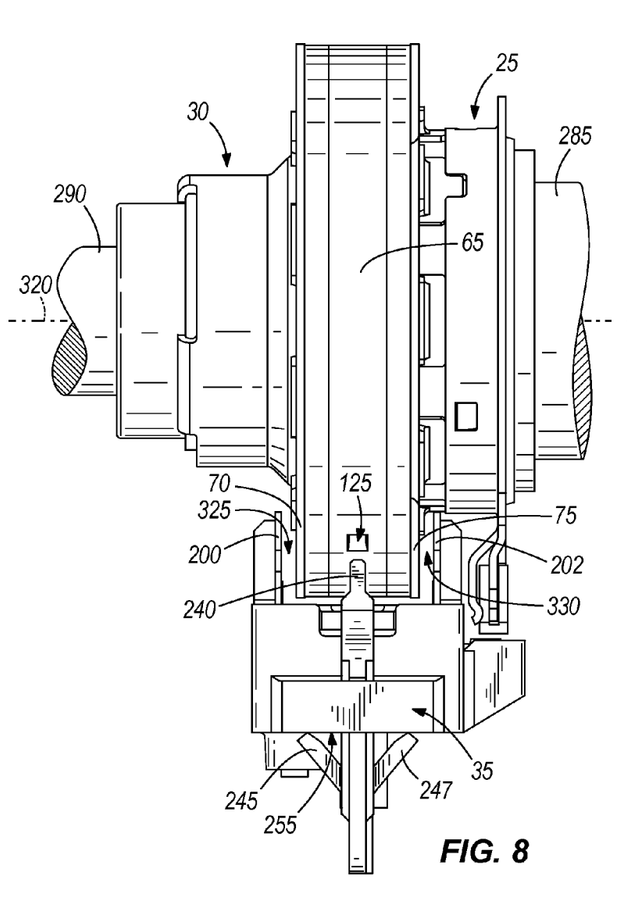
FIG. 8 is front view of the target magnet assembly of FIG. 1 with a sensor module locator in a removed position.
Figure 9:
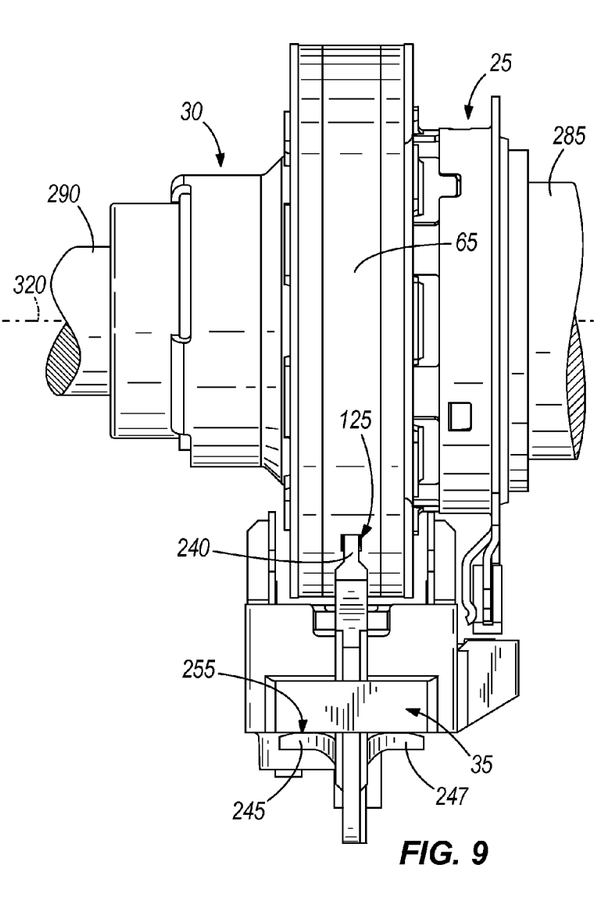
FIG. 9 is front view of the target magnet assembly of FIG. 1 with a sensor module locator in an engagement position.

As shown in FIGS. 8 and 9, before the sensor module 35 is secured to the top portion 310 of the steering gear housing 300, the sensor module 35 is axially aligned relative to the stator subassembly 25. As shown in FIG. 8, the stator subassembly 25 is secured to the input shaft 285 and the magnet subassembly 30 is secured to the output shaft 290. A longitudinal axis 320 runs through the centers of the stator subassembly 25, the magnet subassembly 30, the input shaft 285, and the output shaft 290 such that the stator subassembly 25, the magnet subassembly 30, the input shaft 285, and the output shaft 290 are coaxial. The sensor module 35 is not yet secured to the top portion 310 of the steering gear housing 300. A first air gap 325 is formed between the first stator 70 and the first collector 200. A second air gap 330 is formed between the second stator 75 and the second collector 202. As shown in FIG. 9, when a force is applied to the sensor module locator 35, the biasing members 245 and 247 are compressed and the protrusions 240 and 242 are extended towards the stator subassembly 25 to an engagement position. In the engagement position, each of the protrusions 240 and 242 engages the corresponding engagement aperture 125 of the stator molding 65. The engagement between the protrusions 240 and 242 and the engagement apertures 125 axially aligns the sensor module 35 relative to the stator subassembly 25 and optimizes the sizes of the two air gaps 325 and 330. While the protrusions 240 and 242 engage the engagement apertures 125, the bolts 315 are tightened, thereby securing the sensor module 35 to the top portion 310 of the steering gear housing 300. After the sensor module 35 has been secured, the force is removed from the sensor module 35. As shown in FIG. 8, with the force removed, the biasing members 245 and 247 push against the front surface 255 of the sensor housing 160 thereby retracting the protrusions 240 and 242 from the engagement position to a removed position where the protrusions 240 and 242 cannot interfere or make contact with the stator subassembly 25.

Figure 10:
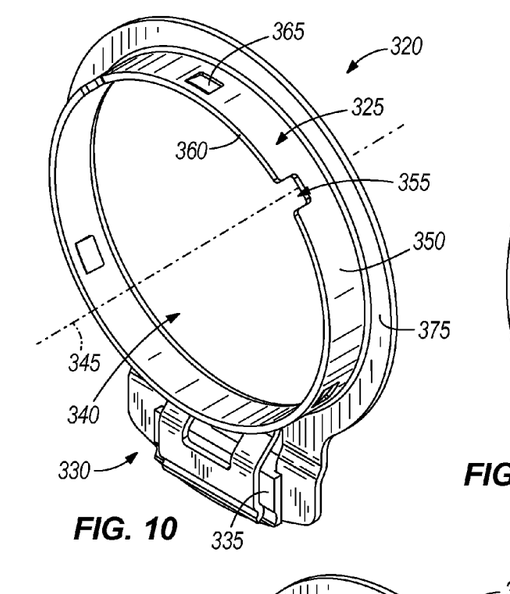
FIG. 10 is a front perspective view of a target magnet assembly.
Figure 11:
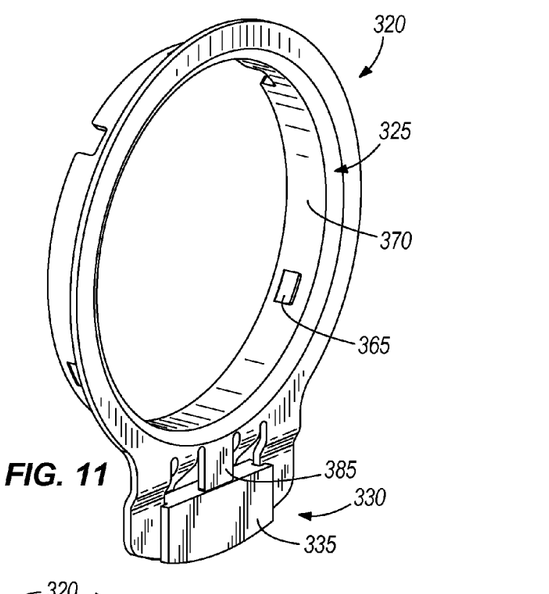
FIG. 11 is a rear perspective view of the target magnet assembly of FIG. 10.

As shown in FIGS. 10 and 11, a target magnet assembly 320 includes an index hub 325 with a mount 330 and a target magnet 335 secured by the mount 330. The index hub 325 defines a central opening 340 having a central axis 345. The central opening 340 is surrounded by a ring 350. Axial cutouts 355 extend from a front surface 360 of the ring 350 partway into the ring 350. Retention tabs 365 extend from an inner surface 370 of the ring 350. A flange 375 extends outwardly from the ring 350. The flange 375 is substantially perpendicular to the ring 350. The mount 330 extends from the flange 375.

Figure 12:
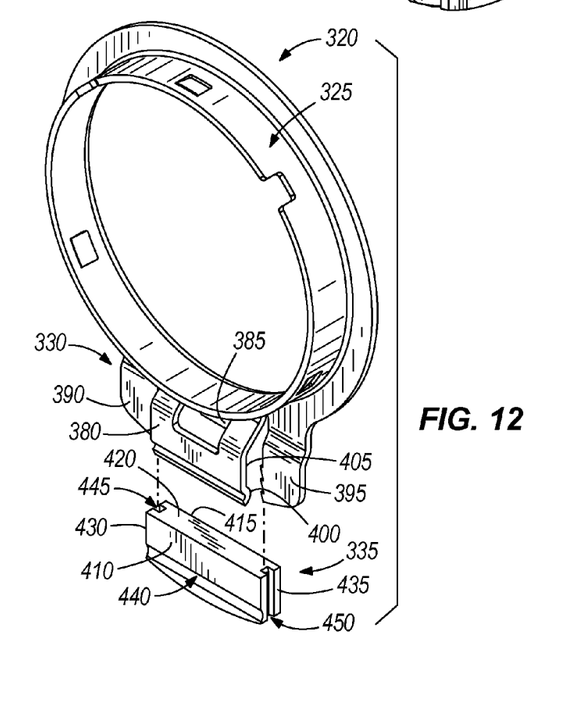
FIG. 12 is an exploded view of the target magnet assembly of FIG. 10.

As best shown in FIG. 12, the mount 330 includes a tab 380, a stop 385 (shown in FIG. 11), and a pair of fingers 390 and 395. A protrusion 400 extends from a rear surface 405 of the tab 380. The tab 380 is at least flexibly connected to the flange 375, thereby allowing the tab 380 to pivot relative to the two fingers 390 and 395.

The target magnet 335 is defined by a front surface 410, a rear surface 415, a top surface 420, a bottom surface 425, a left surface 430, and a right surface 435. A radial retention groove 440 is formed in the front surface 410 for receiving the protrusion 410. A first axial alignment groove 445 is formed in the left surface 430 for receiving the first finger 390. A second axial alignment groove 450 is formed in the right surface 435 for receiving the second finger 395. The mount 330 positions the target magnet 335 in a plane substantially perpendicular to the central axis 345. Alternatively, the mount 330 positions the target magnet 335 in a plane substantially parallel to the central axis 345.

The target magnet 335 is secured by the mount 330 by sliding the target magnet 335 into the mount 330. The first axial alignment groove 445 receives the first finger 390. The second axial alignment groove 450 receives the second finger 395. Each of the fingers 390 and 395 engages the associated axial alignment groove 445 and 450, thereby positioning the target magnet 335 in the axial direction relative to the central axis 345. Alternatively, a single finger 390 could be received by a groove or hole extending through the target magnet 335 from the top surface 420 to the bottom surface 425, thereby positioning the target magnet 335 in the axial direction relative to the central axis 345. The top surface 420 abuts the stop 385, thereby positioning the target magnet 335 in the radial direction relative to the central axis 345. The radial retention groove 440 engages the protrusion 400 of the tab 380 in a snap-fit relationship, thereby securing the target magnet 335 in the mount 330 and fixing the radial position of the target magnet 335 relative to the central axis 345. Additionally, an adhesive could be used as a secondary method for securing the target magnet 335 to the mount 330.

Figure 13:
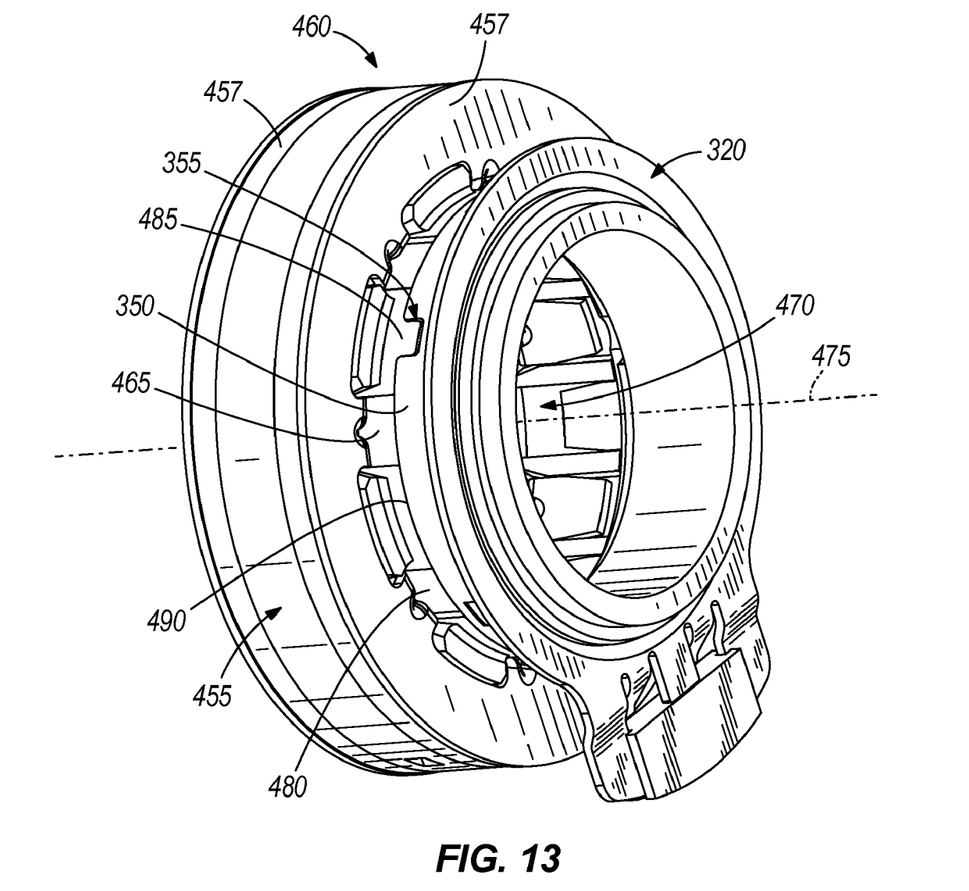
FIG. 13 is a perspective view of a stator assembly including the target magnet assembly of FIG. 10.

As shown in FIG. 13, the target magnet assembly 320 is secured to a stator subassembly 455 to form a stator assembly 460. The stator subassembly 455 includes a ring 465 defining a central opening 470. The central opening 470 has a central axis 475. An outer surface 480 of the ring 465 includes multiple alignment tabs 485 that are sized and shaped to engage the cutouts 355 in the ring 350 of the index hub 325. Multiple stops 490 extend from the outer surface 480. The stator subassembly 455 also includes two magnetic stators 457.

When the target magnet assembly 320 is secured to the stator subassembly 455, the cutouts 355 receive the alignment tabs 485, thereby providing rotational alignment between the target magnet assembly 320 and the stator subassembly 455. The front surface 360 of the ring 350 of the index hub 325 abuts the stops 490 of the stator subassembly 455, thereby providing axial alignment between the target magnet assembly 320 and the stator subassembly 455. The retention tabs 365 of the index hub 325 displace the material forming the ring 465 of the stator subassembly 455, thereby securing the target magnet assembly 320 to the stator subassembly 455. The central axis 475 of the stator subassembly 455 is coaxial with the central axis 345 of the target magnet assembly 320 when the target magnet assembly 320 is secured to the stator subassembly 455. As described, the stator subassembly 455 is a component in a three-piece moving magnet torque sensor. In other embodiments, the stator subassembly could be a component in a single-piece moving magnet torque sensor, a clockspring torque sensor, or any type of sensor where a component is mounted to a shaft.

Figure 14:
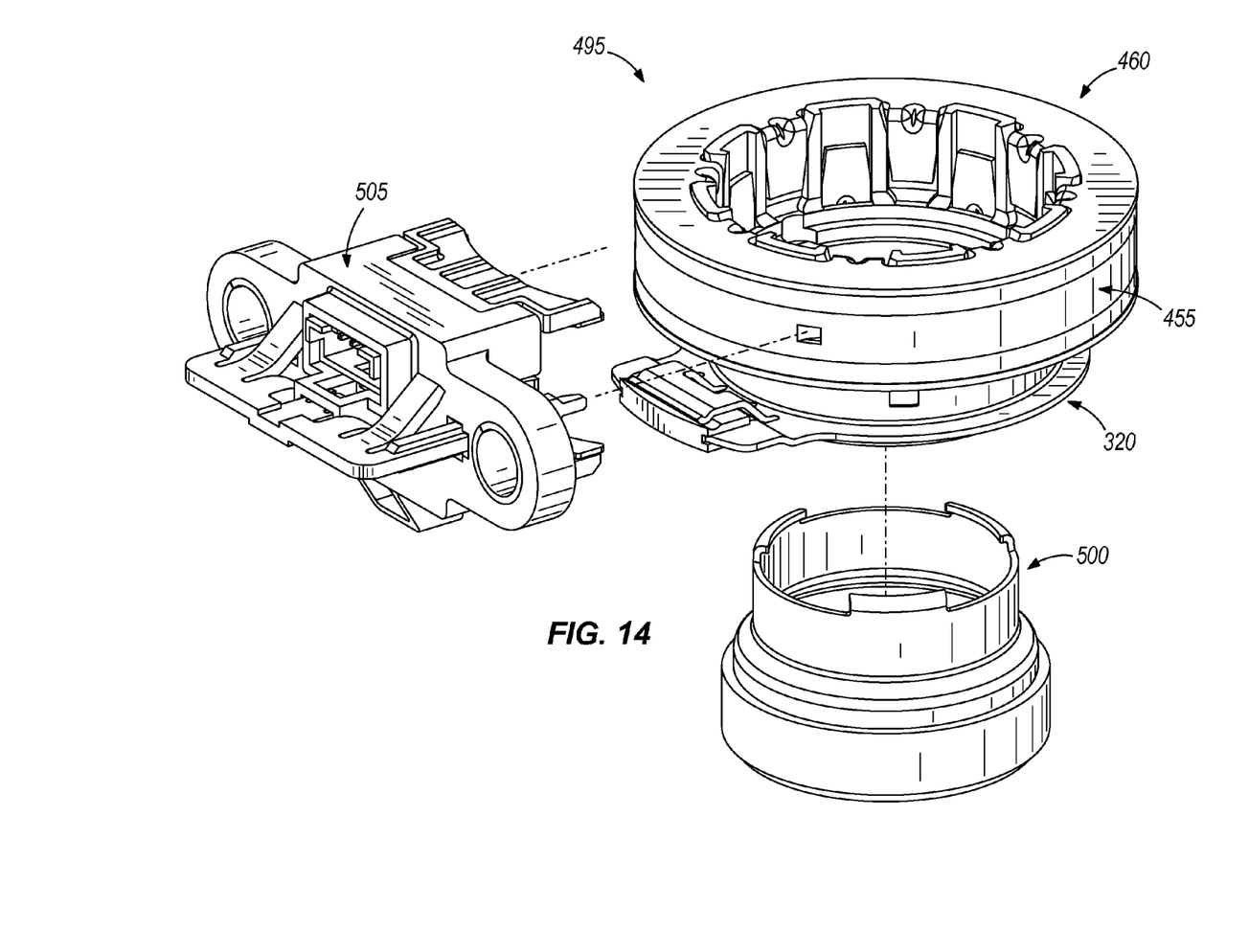
FIG. 14 is an exploded view of a torque sensor including the target magnet assembly of FIG. 10.

As shown in FIG. 14, the stator assembly 460 is a component of a torque sensor 495. The torque sensor 495 is used to sense the torque applied to a first rotating shaft by comparing the relative rotational displacement between the first shaft and a second rotating shaft connected to the first shaft by a torsion bar. The torque sensor 495 can be used with a variety of mechanical assemblies, but will be described as used with a steering gear assembly of an automobile. The torque sensor 495 includes the stator assembly 460, a multipole magnet assembly 500, and a sensor module 505.

Figure 15:
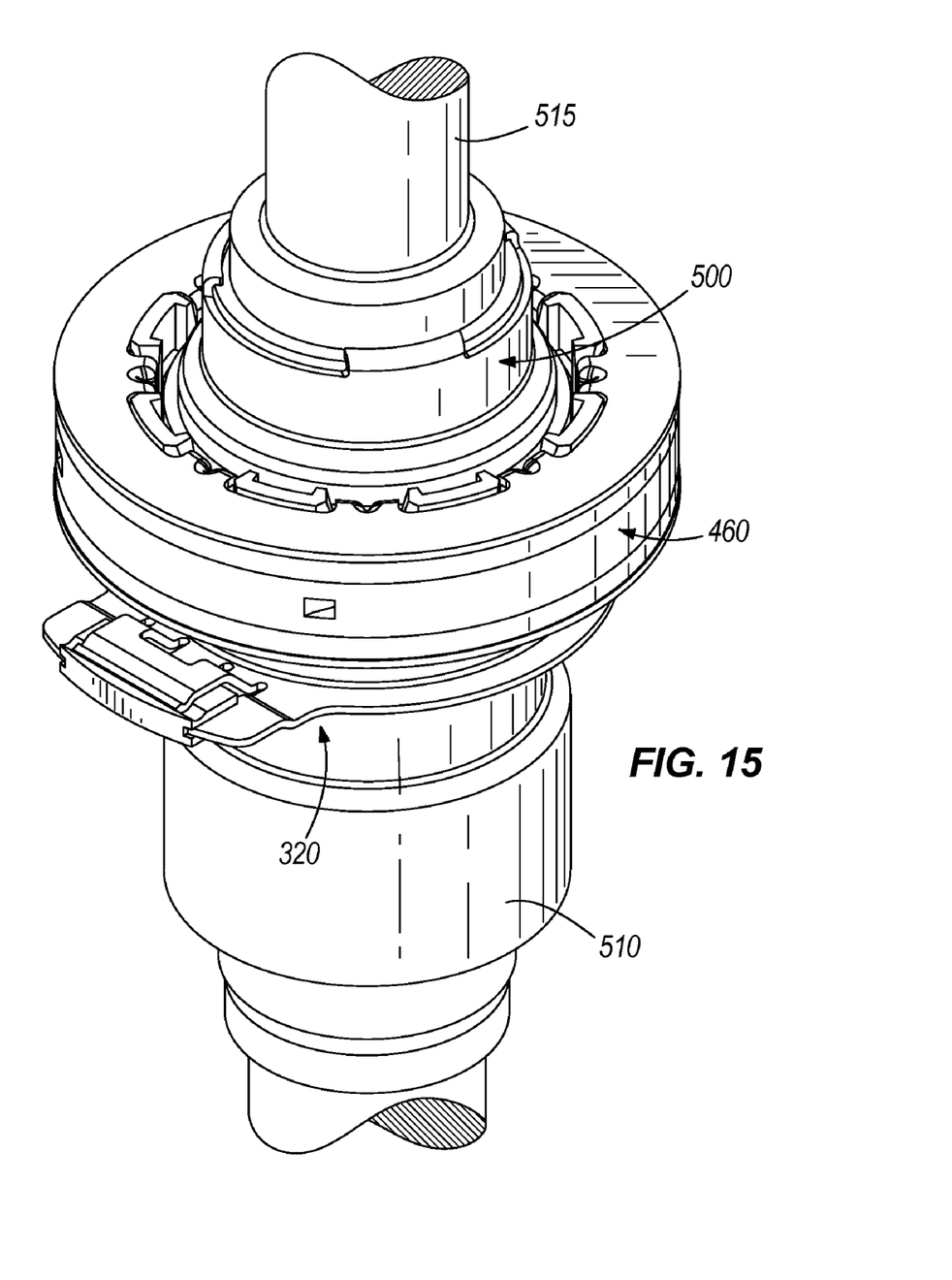
FIG. 15 is a perspective view of a portion of a steering gear assembly including the target magnet assembly of FIG. 10.

As shown in FIG. 15, the stator assembly 460 is secured to an input shaft 510 and the multipole magnet assembly 500 is secured to an output shaft 515. The input shaft 510 and the output shaft 515 are connected by a torsion bar (not shown).

Figure 16:
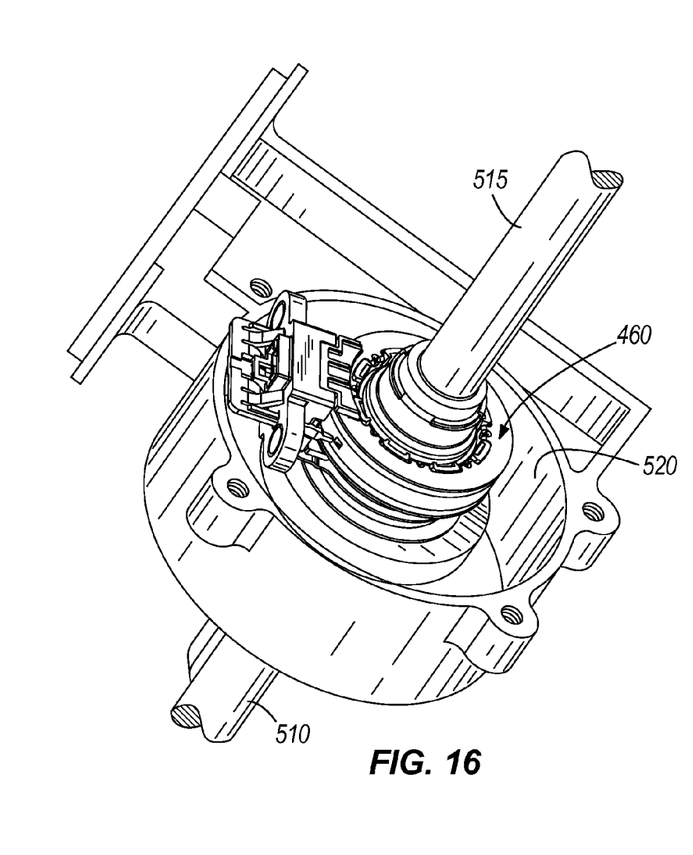
FIG. 16 is a perspective view of a portion of a steering gear assembly including the target magnet assembly of FIG. 10, with a top portion of a steering gear housing not shown.

As shown in FIG. 16, the stator assembly 460 is positioned within a steering gear housing 520 when the stator assembly 460 is secured to the input shaft 510. The input shaft 510 and the output shaft 515 extend through the steering gear housing 520.

Figure 17:
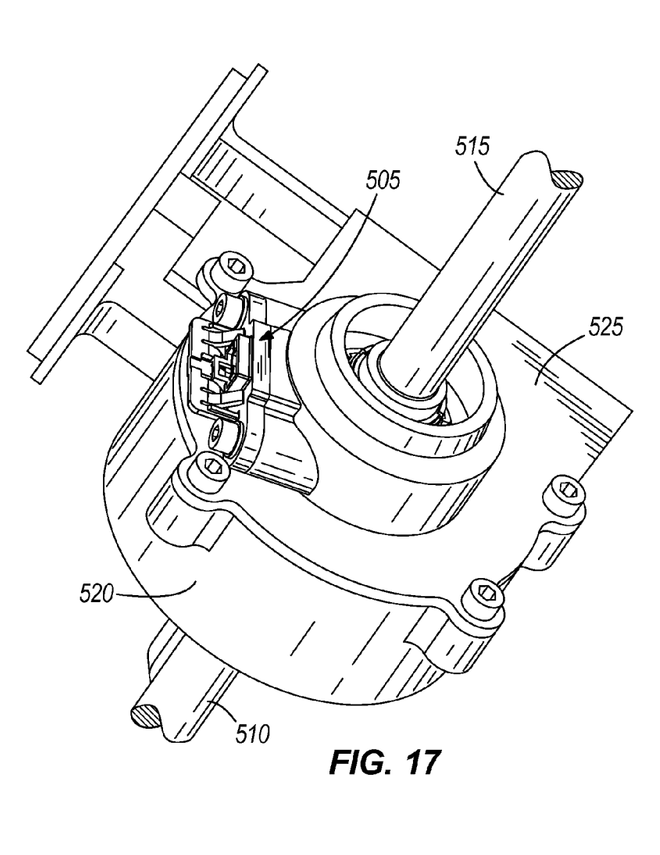
FIG. 17 is a perspective view of a portion of a steering gear assembly including the target magnet assembly of FIG. 10.
Figure 18:
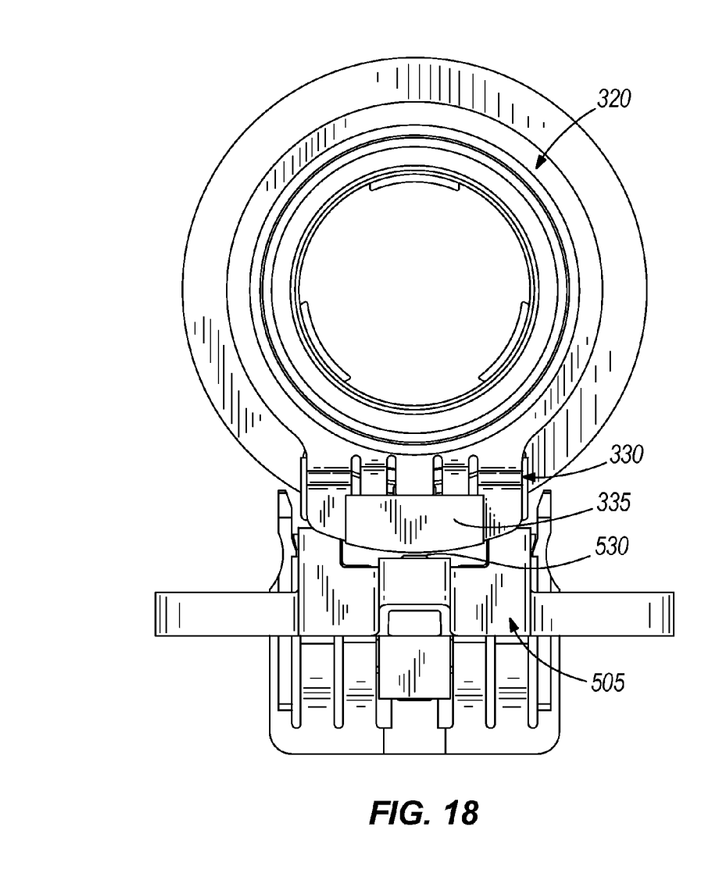
FIG. 18 is top view of the target magnet assembly of FIG. 10 in a home position.
Figure 19:
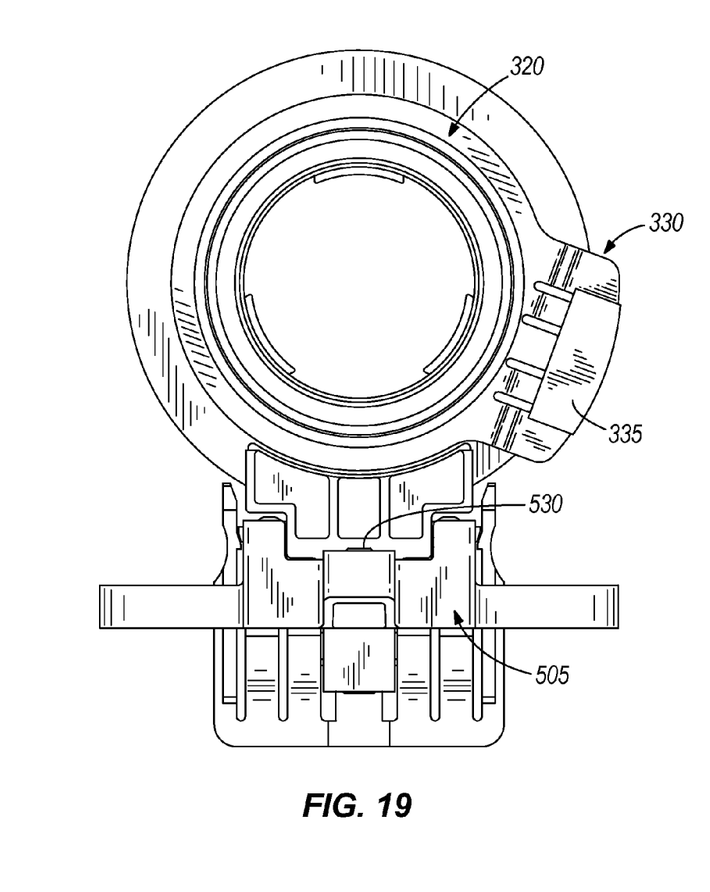
FIG. 19 is top view of the target magnet assembly of FIG. 10 not in the home position.

As shown in FIG. 17, when the torque sensor 495 is assembled, the sensor module 505 is secured to a top portion 525 of the steering gear housing 520. As shown in FIG. 18, the sensor module 505 includes a position sensor 530. Typically, the position sensor 530 is a Hall effect sensor capable of detecting changes in a magnetic field. In other embodiments, other sensors capable of detecting changes in a magnetic field could also be used. In a home position, the position sensor 230 is positioned adjacent to the target magnet 35. When a steering wheel connected to the input shaft 510 is turned, the input shaft 510 rotates, thereby rotating the target magnet 335 out of the home position, as shown in FIG. 19.

The position sensor 530 detects the strength of the magnetic field produced by the target magnet 335. By comparing the magnetic field detected by the position sensor 530 when the target magnet 335 is in the home position to the magnetic field detected by the position sensor 530 when the target magnet 335 is not in the home position, the position sensor 530 is configured to signal when the target magnet 335 is in the home position. In some embodiments, the position sensor 530 is configured to signal when the target magnet 335 is not in the home position. In other embodiments, the position sensor 530 is configured to signal the position of the target magnet 335 relative to the home position based on the relative strength of the magnetic field produced by the target magnet 335. In some embodiments, the sensor module 505 includes one or more torque sensors. Typically, the torque sensor is a Hall effect sensor capable of detecting changes in a magnetic field produced by the multipole magnet assembly 500 and the magnetic stators 457 of the stator subassembly 455.

In one embodiment, the target magnet assembly 320 is not a component of a torque sensor 495. Instead, the target magnet assembly 320 is a component of a stand-alone position sensor and is secured directly to a rotating shaft in a manner similar to attaching the target magnet assembly 320 to the stator subassembly 455.

Thus, the invention provides, among other things, a three-piece torque sensor and a sensor module locator. Various features and advantages of the invention are set forth in the following claims.

What is claimed is:

1. A target magnet assembly configured to be secured to a rotating shaft of a steering gear assembly, the target magnet assembly comprising:
    an index hub with a mount, the mount comprising;
        a tab with a protrusion extending from the tab,
        a finger, and
        a stop; and
    a magnet secured by the mount, the magnet comprising an axial retention groove receiving the finger, a top surface abutting the stop, and a radial retention groove receiving the protrusion.

2. The target magnet assembly of claim 1, wherein the mount further comprises a second finger and the magnet further comprises a second axial alignment groove for receiving the second finger.

3. The target magnet assembly of claim 1, wherein the radial retention groove engages the protrusion in a snap-fit relationship.

4. The target magnet assembly of claim 2, wherein the radial retention groove engages the protrusion in a snap-fit relationship.

5. The target magnet assembly of claim 1, further comprising a position sensor positioned adjacent to the magnet when the magnet is in a home position.

6. The target magnet assembly of claim 2, further comprising a position sensor positioned adjacent to the magnet when the magnet is in a home position.

7. The target magnet assembly of claim 3, further comprising a position sensor positioned adjacent to the magnet when the magnet is in a home position.

8. The target magnet assembly of claim 4, further comprising a position sensor positioned adjacent to the magnet when the magnet is in a home position.

9. A stator assembly configured to be used as a component of a torque sensor for a steering gear assembly, the stator assembly comprising:
    a stator subassembly; and
    a target magnet assembly secured to the stator subassembly, the target magnet assembly comprising;
        an index hub with a mount, the mount comprising,
            a tab with a protrusion extending from the tab,
            a finger, and
            a stop, and
        a magnet secured by the mount, the magnet comprising an axial retention groove receiving the finger, a top surface abutting the stop, and a radial retention groove receiving the protrusion.

10. The stator assembly of claim 9, wherein the mount further comprises a second finger and the magnet further comprises a second axial alignment groove for receiving the second finger.

11. The stator assembly of claim 9, wherein the radial retention groove engages the protrusion in a snap-fit relationship.

12. The stator assembly of claim 10, wherein the radial retention groove engages the protrusion in a snap-fit relationship.

13. The stator assembly of claim 9, further comprising a position sensor positioned adjacent to the magnet when the magnet is in a home position.

14. The stator assembly of claim 10, further comprising a position sensor positioned adjacent to the magnet when the magnet is in a home position.

15. The stator assembly of claim 11, further comprising a position sensor positioned adjacent to the magnet when the magnet is in a home position.

16. The stator assembly of claim 12, further comprising a position sensor positioned adjacent to the magnet when the magnet is in a home position.

17. The stator assembly of claim 9, wherein the index hub further comprises a plurality of cutouts extending from a front surface of the index hub into the index hub; and
    wherein the stator subassembly comprises a plurality of alignment tabs sized and shaped to engage the cutouts.

18. The stator assembly of claim 17, wherein the stator subassembly further comprises a plurality of stops that abut the front surface of the index hub.

19. The stator assembly of claim 9, wherein the index hub further comprises a plurality of retention tabs that displace a portion of the stator subassembly to secure the index hub to the stator subassembly.

20. A method for securing a target magnet to a hub, the method comprising:
    providing a hub with a mount, the mount comprising;
        a tab with a protrusion extending from the tab,
        a finger, and
        a stop;
    providing a target magnet, the magnet comprising;
        an axial retention groove for receiving the finger, a top surface for abutting the stop, and a radial retention groove for receiving the protrusion; and
    inserting the target magnet into the mount, thereby causing the axial retention groove to receive the finger, the top surface to abut the stop, and the radial retention groove to receive the protrusion.

* * * * *